United States Patent [19]

Schmidt

[11] 3,821,614

[45] June 28, 1974

[54] SEMI-CONDUCTOR UNIT WITH FLOW-DEPOSITED SOLDER

[75] Inventor: Günther Schmidt, Ludwigsburg, Germany

[73] Assignee: Robert Bosch GmbH, Stuttgart, Germany

[22] Filed: Apr. 4, 1973

[21] Appl. No.: 347,917

Related U.S. Application Data

[62] Division of Ser. No. 248,520, April 28, 1972.

[30] Foreign Application Priority Data

May 5, 1971 Germany........................... 2122104

[52] U.S. Cl............... 317/234 R, 29/470.1, 29/589, 317/234 L, 317/234 E

[51] Int. Cl............................. H01l 3/00, H01l 5/00

[58] Field of Search................ 317/234, 1, 3, 4, 5.2, 317/5.4, 470.1; 29/589

[56] References Cited

UNITED STATES PATENTS

| | | | |
|---|---|---|---|
| 2,987,597 | 6/1961 | McCotter | 317/234 G |
| 3,199,000 | 8/1965 | Nippert | 317/234 A |
| 3,200,310 | 8/1965 | Carman | 317/234 A |
| 3,279,039 | 10/1966 | Nippert | 317/234 G |
| 3,584,265 | 6/1971 | Nier | 317/234 L |
| 3,708,722 | 1/1973 | Wiles | 317/234 E |

*Primary Examiner*—Andrew J. James
*Attorney, Agent, or Firm*—Michael S. Striker

[57] ABSTRACT

A semi-conductor element is to be connected with one or more conductor members by soft-soldering. The conductor member is provided with a nose-like projection having circumferential surface portions and a free end face which is planar and with which the circumferential surface portions define acute angles. Liquid solder is flow-deposited on the surface portions and on the end face, forming a solder-coating on them, particularly on the surface portions, and the coated endface is in abutment with the semiconductor element and soldered thereto.

4 Claims, 8 Drawing Figures

SEMI-CONDUCTOR UNIT WITH FLOW-DEPOSITED SOLDER

CROSS-REFERENCE TO RELATED APPLICATION

The present application is a division of my copending application Ser. No. 248,520, filed Apr. 28, 1972.

BACKGROUND OF THE INVENTION

The present invention relates generally to semi-conductor units, and more particularly to a novel semi-conductor unit.

It is known to connect semi-conductor elements with their associated conductor members by soft soldering, in particular by resorting to a technique known as "flow-depositing." This technique is widely used and particularly advantageous, because any desired surface portions, no matter what their configuration, can be provided with a solder coating by resorting to the flow-deposition method. However, this method does have one disadvantage, namely that even under the most advantageous of circumstances and the best possible parameters in terms of temperature and flow speed chosen for the liquid solder, it is impossible to control the deposition so precisely that a certain minimum deposited solder quantity will have to be deposited. In other words, the size and the geometry of the surface to be coated with the solder dictate, when the coating is effected by the flow-deposition method, that a certain minimum quantity of solder will always become deposited even if it is desired that the coating should be less than this minimum quantity. As a result of this it has been observed that when a conductor member, which is the component of a semi-conductor unit that is usually solder coated in this manner, is connected with the semi-conductor element of the unit, thick solder joints develop which is, quite evidently, undesirable. Furthermore, when the solder connection of the semi-conductor element with the conductor member is effected, the deposited solder frequently has a tendency to be squeezed out beyond the contact faces of the semi-conductor element with the conductor member, and that this results to shorting via the thus squeezed out solder or to interference with the subsequently following etching treatment of the unit.

SUMMARY OF THE INVENTION

Accordingly, it is an object of the present invention to overcome the disadvantages of the prior art. More particularly it is an object of the present invention to provide an improved semi-conductor unit which is not possessed of the disadvantages inherent in the prior art.

In pursuance of these objects, and of others which will become apparent hereafter, one feature of the invention resides in a semi-conductor unit having a conductor member formed with a nose-like projection bounded by circumferential surface portions and by a free end face. Liquid solder is flow-deposited on the surface portions as well as on the end face to form a solder-coating on them. The thus coated end face is in abutment with the semi-conductor element and the latter is adhered to the solder so as to connect the element and the member with one another.

This avoids the disadvantages of the prior art in that the nose-like configuration of the projection formed on the conductor member assures that when a flow of solder comes in contact with the circumferential surface portions and the free end face of this nose-like projection, the surface tension of the liquid solder will prevent the development of more than a thin layer of solder on the free end face. Most of the deposited solder will flow onto the circumferential surface portions of the projections so that when subsequently the thus coated conductor member is solder-connected with the semi-conductor element, only a thin solder joint will be obtained between them.

It is advantageous to so configurate the nose-like projection that the free end face thereof is planar and that the lateral flanks of the projection, that is the circumferential surface portions thereof, include an obtuse angle with the plane of the free end face.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
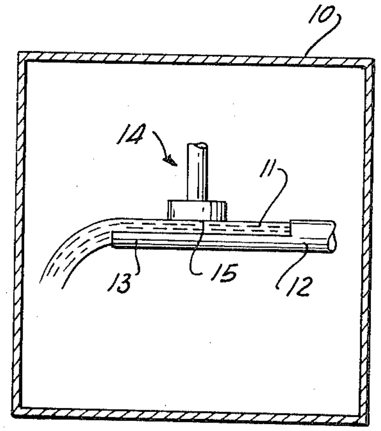
FIG. 1 illustrates diagrammatically an arrangement for flow-depositing of a solder coating on a contact member according to the prior art.

Discussing firstly FIG. 1 it will be seen that in this figure there is illustrated diagrammatically an arrangement for flow-depositing of liquid solder on a surface portion of a contact member according to the prior art. The solder may be a lead-tin alloy and the principle of such application is of course already known. It has therefore only been diagrammatically illustrated.

Figure 3:
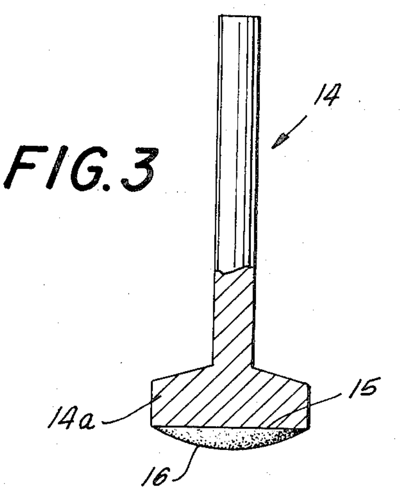
FIG. 3 is an axial section of the contact member shown in FIG. 1, that is a contact member according to the prior art.
Figure 4:
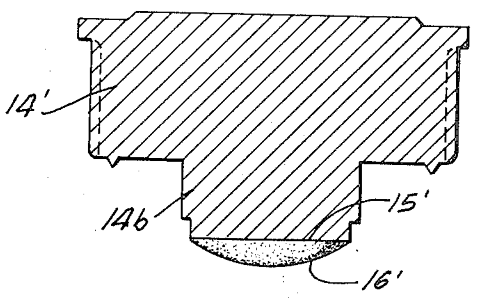
FIG. 4 is an axial section of a further contact member according to the prior art.

As FIG. 1 shows, there is provided an enclosed space which is diagrammatically indicated at reference numeral 10 and whose interior is filled with a reducing protective gas, the space 10 being closed against the ambient atmosphere. A flow of liquid solder is produced in this space, for instance in the form of a directed and guided stream 11 of solder which is expelled from a nozzle or jet 12 and which may be guided in a trough-shaped guide 13. The conductor member, which may for instance be configurated as a head lead 14, or as a centrally thickened metallic plate 14', as diagrammatically illustrated in the prior-art embodiments shown in FIGS. 3 and 4, is placed into contact with the stream 11 of liquid solder, and thus is provided with a solder coating 16 at its free end face or contact face 15'. The latter is provided, as shown in FIG. 4, on a thickened or projecting portion 14*b*.

The configuration and thickness of the solder layer or coating 16, 16' (FIGS. 3 and 4) is clearly evident and it will be seen that it is rather thick and of substantially convex contour. This thickness can be influenced to a certain extent by variations in the temperature of the solder and in the flow speed thereof, but only within certain defined limits. In many instances, however, even the minimum thickness of a solder layer which can be so deposited is too great to be practical or advantageous.

Figure 2:
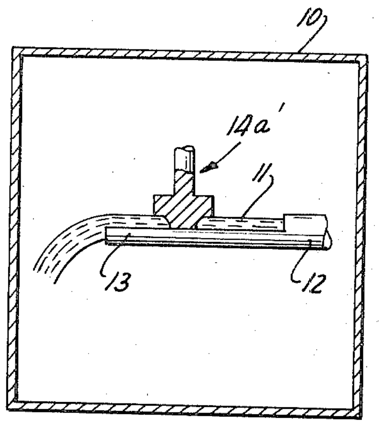
FIG. 2 is a view similar to FIG. 1 but illustrating the deposition of solder on a contact member constructed according to the invention.

This is avoided by the present invention. FIG. 2 shows a view similar to FIG. 1 but illustrating how a conductor member 14*a* configurated in accordance with the present invention (shown in detail in FIG. 5) can be solder coated. Similar solder coating can be effected on the plate-shaped contact member 14*a'* shown in FIG. 6.

It will be seen that the member 14*a'* has a nose-like projection 14*b'* which is provided with a free end face 15*a* of planar configuration and with circumferential surface portions or flanking surface portions 15*b* which in the illustrated embodiment include with the surface 15*a* respective obtuse angles. It will be seen that when the member 14*a'* of FIG. 5 is provided with a solder coating by the flow-deposition method as illustrated in FIG. 2, there will form on the surface 15*a* a solder coating 16*a* which is much thinner than the solder coating 16 in FIG. 3, because due to the surface tension of the solder the major portion of the solder which adheres to the projection 14*b'* will be retained on the surface portions 15*b* in form of layers 16*b*.

Figure 6:
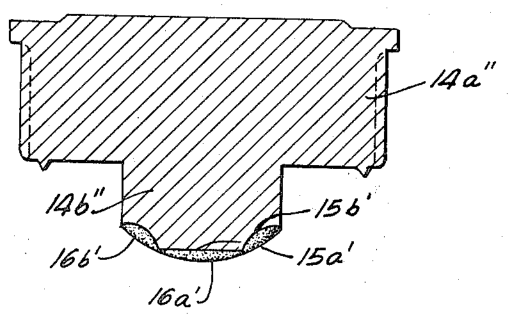
FIG. 6 is a view similar to FIG. 4 illustrating another contact member according to the present invention.

The same is true with respect to the member 14*a''* shown in FIG. 6. Here the projection of nose-like configuration is identified with reference numeral 14*b''* and has the free end face 15*a'* and the circumferential surface portion 15*b'*, with the deposited solder layer 16*a'* on the surface portion 15*a'* being again much thinner than the layer 16' in FIG. 4. Again, solder layers 16*b'* will form on the surface portions 15*b'* and will constitute the major part of the solder which will adhere to the projection 14*b'*, being retained on the surface portion 15*b'* due to the surface tension of the solder.

Figure 5:
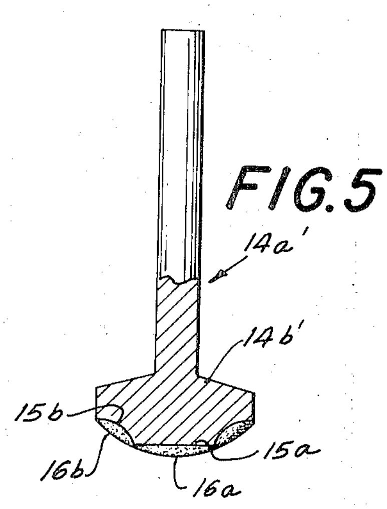
FIG. 5 is a view similar to FIG. 3 but illustrating a contact member according to the present invention.

In FIG. 6, as in FIG. 5, the surface portion 15*b'* include obtuse angles with the surface portion 15*a'*.

Of course, the members 14*a'* or 14*a''* will be inserted into the flow 11 of solder (compare FIG. 2) to such an extent that both the surfaces 15*a*, 15*a'* and the surface portions 15*b*, 15*b'* will be immersed and come in contact with the liquid solder as shown in FIG. 2 by way of the member 14*a'*.

Figure 7:
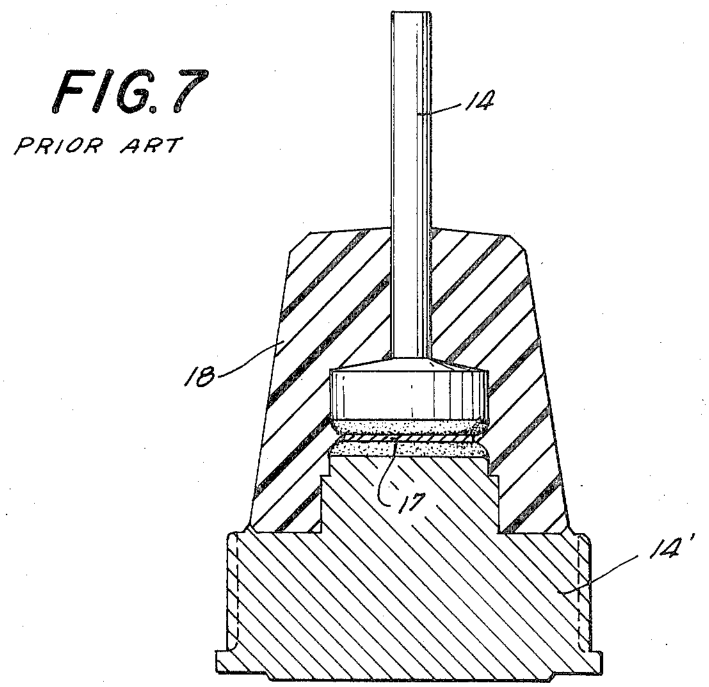
FIG. 7 is an axial section of a semi-conductor unit produced in accordance with the prior art.
Figure 8:
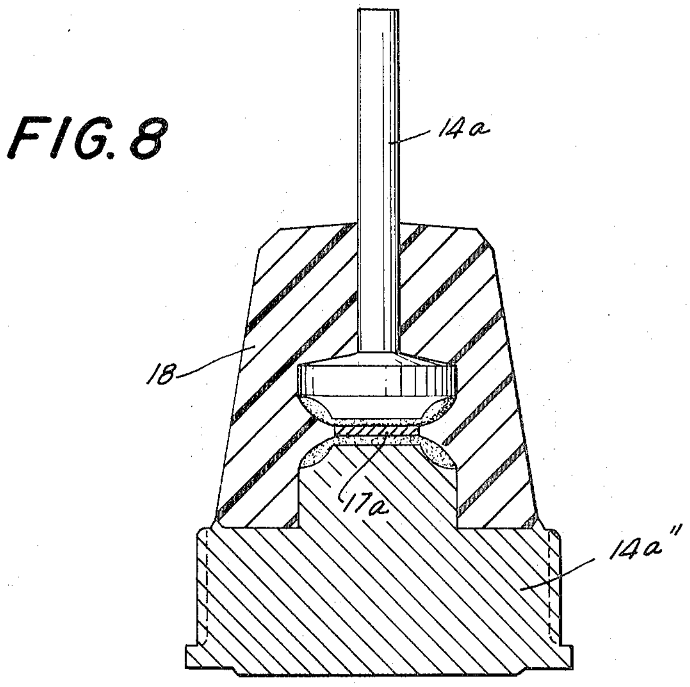
FIG. 8 is a view similar to FIG. 7 but illustrating a semi-conductor unit produced in accordance with the present invention.

FIGS. 7 and 8 show, by way of comparison, axial sections through two semi-conductor units each having a solder connection and with one being produced according to the prior art (FIG. 7) and the other (FIG. 8) being produced according to the present invention. It will be seen that in FIG. 7 the unit has the conductor members 14 and 14' of the prior art as illustrated in FIGS. 3 and 4, being solder connected with the semi-conductor element 17 with which they are abutted and subsequently soldered to it in a single passage through a soldering oven. Because of the relatively great quantity of solder which is present on the surfaces 15, 15' of the members 14, 14' there exists the danger that during such passage through the soldering oven shorts may develop via the excess solder.

In FIG. 8, where the semi-conductor element 17*a* is solder-connected with the members 14*a'*, 14*a''*, this danger does not exist because the amount of solder present on the surfaces 15*a*, 15*a'* (see FIGS. 5 and 6) is substantially smaller than in the prior art. The connection is effected in the same way as with respect to FIG. 7, that is when the members 14*a'* and 14*a''* are placed into abutment with the semi-conductor element 17*a*, the assembly is past in a single passage through a soldering oven to be connected by soldering.

In both instances the finished assembly is potted with a synthetic resin material 18.

It will be understood that each of the elements described above, or two or more together, may also find a useful application in other types of constructions differing from the types described above.

While the invention has been illustrated and described as embodied in a semi-conductor unit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A semi-conductor unit, comprising a semi-conductor element; at least one conductor member having a nose-like projection formed with a transverse end face facing said semi-conductor element, and with a circumferential surface having a circumferential surface portion rearwardly adjacent said transverse end face and being inwardly arcuate so as to form an annular groove of arcuate cross-section rearwardly adjacent said transverse end face; and a quantity of solder connecting said projection of said conductor member with said semi-conductor element and including a smaller portion interposed between and bonding together said transverse end face and said semi-conductor element, and a larger portion received in said annular groove rearwardly adjacent said transverse end face.

2. A semi-conductor unit as defined in claim 1, wherein said solder is flow-deposited on said endface and in said groove.

3. A semi-conductor unit as defined in claim 1, wherein said endface is a planar contact face.

4. A semi-conductor unit as defined in claim 3, said surface portion of said groove including obtuse angles with said planar contact face.

* * * * *